United States Patent [19]

Abrant

[11] Patent Number: 4,539,656

[45] Date of Patent: Sep. 3, 1985

[54] MEMORY ACCESS SELECTION CIRCUIT

[75] Inventor: Robert J. Abrant, Villa Park, Ill.

[73] Assignee: GTE Automatic Electric Incorporated, Northlake, Ill.

[21] Appl. No.: 438,083

[22] Filed: Nov. 1, 1982

[51] Int. Cl.³ .................. G06F 9/46; G06F 13/06
[52] U.S. Cl. .................. 364/900; 364/200
[58] Field of Search ........ 364/200, 900, 200 MS File, 364/900 MS File

[56] References Cited

U.S. PATENT DOCUMENTS

| | | | |
|---|---|---|---|
| 3,921,145 | 11/1975 | Emm et al. | 364/200 |
| 4,096,572 | 6/1978 | Namimoto | 364/200 |
| 4,164,787 | 8/1979 | Aranguren | 364/200 |
| 4,313,161 | 1/1982 | Hardin et al. | 364/200 |
| 4,325,116 | 4/1982 | Kranz et al. | 364/200 |
| 4,374,413 | 2/1983 | Comfort et al. | 364/200 |
| 4,400,771 | 8/1983 | Suzuki et al. | 364/200 |
| 4,402,040 | 8/1983 | Evett | 364/200 |
| 4,415,972 | 11/1983 | Adcock | 364/200 |

*Primary Examiner*—James D. Thomas
*Assistant Examiner*—Thomas Lee
*Attorney, Agent, or Firm*—Gregory G. Hendricks

[57] ABSTRACT

A memory access selection circuit including a microprocessor, address, data and control multiplexers, a random access memory, storage circuits and related logic circuitry. This circuit allows both an external processor and the microprocessor to receive data from and transmit data to, the random access memory. The microprocessor controls access of the external processor to the random access memory by controlling and monitoring the multiplexer and storage circuits. This prevents erroneous data, address and control signals from appearing at the memory when switching between the microprocessor and the external processor as sources to the memory.

9 Claims, 1 Drawing Figure

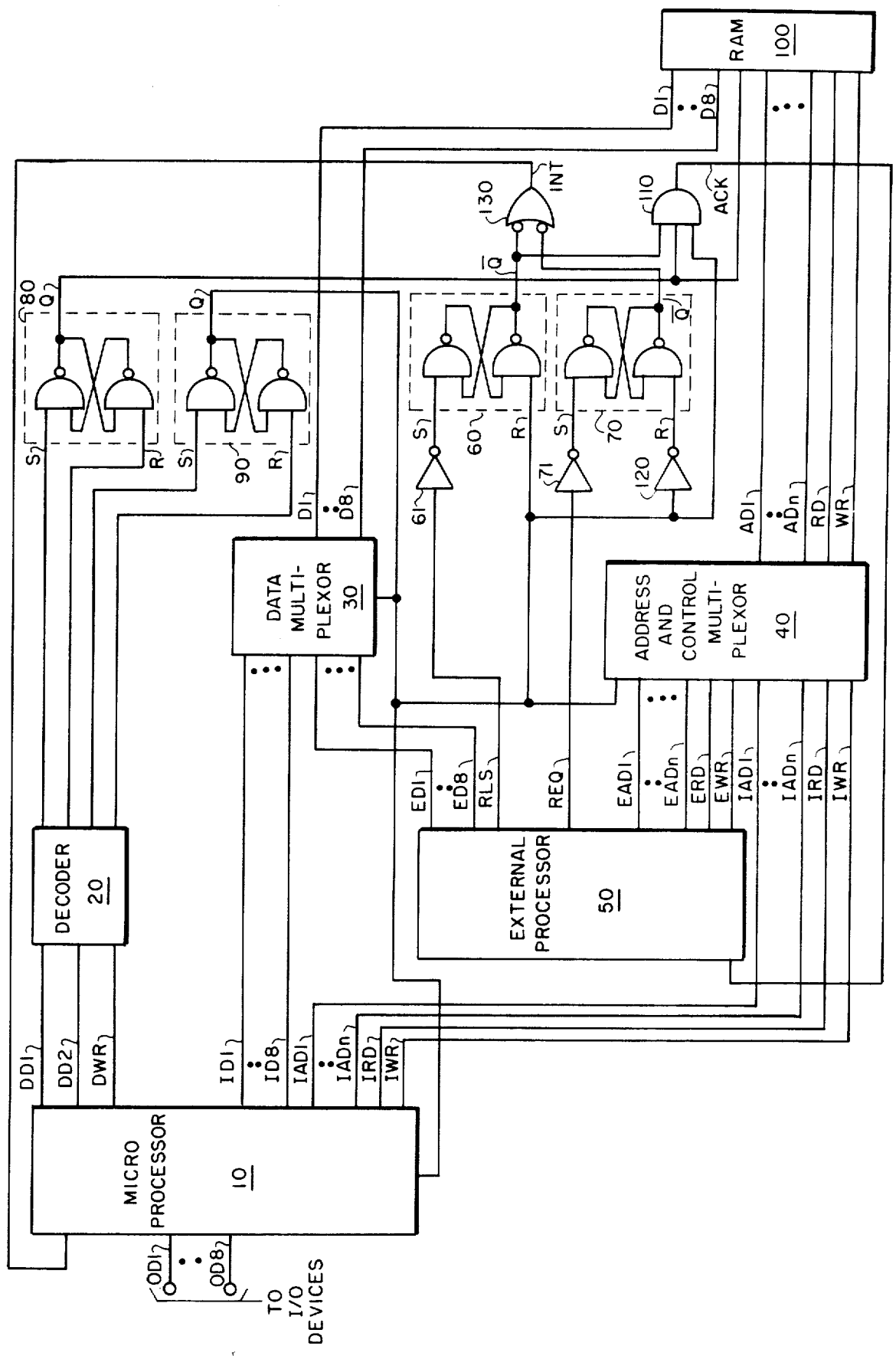

4,539,656

MEMORY ACCESS SELECTION CIRCUIT

FIELD OF THE INVENTION

The present invention relates to memory circuits and more particularly to a memory access selection circuit for controlling access of multiple processors to a single memory.

BACKGROUND OF THE INVENTION

Memory circuits are often used as buffers to store data for and from various input/output (I/O) devices such as terminals, printers or modems. These memories are often accessed by multiple processors. However, in order to prevent erroneous address, data or control signals, access to the memory must be controlled, such that only one processor has access to the memory at any particular time.

Such memory access control typically requires complex timing and logic circuitry.

Accordingly, it is the object of the present invention to provide a novel memory access selection circuit which does not utilize complex timing and logic circuitry.

SUMMARY OF THE INVENTION

In accordance with the present invention, a memory access selection circuit is provided for use in a computer system which includes an external processor, operative to provide external read and write signals, and further operative to receive and transmit data in association with said external read and write signals, respectively. The memory access selection circuit of this invention includes an internal processor operative to provide internal read and write signals, and further operative to receive and transmit data in association with the internal read and write signals, respectively. This processor also provides enable, disable and first and second select signals.

A memory is also included and it is operative to transmit data in response to the enable signal and the internal or external read signal. The memory is further operative to receive data in response to the enable signal and the internal or external write signal.

Multiplexing means is connected to the internal and external processors and the memory. It is operative in response to the first select signal to connect the internal processor to the memory, thereby allowing the internal processor to transmit data to, and receive data from, the memory, in association with the internal write and read signals, respectively. The multiplexing means is further operative in response to the second select signal to connect the external processor to the memory, thereby allowing the external processor to transmit data to, and receive data from, the memory, in association with the external write and read signals, respectively.

DESCRIPTION OF THE DRAWING

The single FIGURE of the accompanying drawing is a schematic diagram of a memory access selection circuit in accordance with the present invention.

DESCRIPTION OF THE PREFERRED EMBODIMENT

Referring now to the accompanying drawing the memory access selection circuit of the present invention is shown. MICROPROCESSOR 10 is shown connected to DECODER 20 via decoder data leads DD1 and DD2 and decoder write lead DWR. MICROPROCESSOR 10 is also connected to bi-directional DATA MULTIPLEXER 30 via internal data leads, ID1-ID8, and it is further connected to ADDRESS AND CONTROL MULTIPLEXER 40 via internal address leads, IAD1-IADn, and internal read and write leads, IRD and IWR, respectively. MICROPROCESSOR 10 is also shown connectable to I/O DEVICES via output data leads OD1-OD8.

EXTERNAL PROCESSOR 50 is shown connected to DATA MULTIPLEXER 30 via external data leads ED1-ED8. It is also shown connected to ADDRESS AND CONTROL MULTIPLEXER 40 via external address leads EAD1-EADn, and external read and write leads, EDR and EWR. EXTERNAL PROCESSOR 50 is further connected to inverters 61 and 71 via the release (RLS) and request (REQ) leads, respectively. These inverters are connected to the set (S) input of latches 60 and 70 (storage circuit), respectively.

DECODER 20 is connected to the set (S) and reset (R) inputs of enable latch 80 and the set (S) and reset (R) inputs of select latch 90. These latches operate as a storage circuit. The Q output of latch 80 is connected to AND gate 110 and random access memory (RAM) 100 which is also connected to DATA MULTIPLEXER 30 via data leads D1-D8, and ADDRESS AND CONTROL MULTIPLEXER 40 via address leads AD1-ADn and read and write leads RD and WR, respectively.

The Q output of select latch 90 is connected to MICROPROCESSOR 10, DATA MULTIPLEXER 30, ADDRESS AND CONTROL MULTIPLEXER 40, inverter 120, the reset (R) input of latch 60, and AND gate 110. Inverter 120 is connected to the reset (R) input of latch 70. The reset outputs, $\overline{Q}$, of latches 60 and 70 are connected to OR gate 130 and the reset ($\overline{Q}$) output of latch 60 is also connected to AND gate 110. AND gate 110 operates as an acknowledge signaling circuit, and latches 60 and 70, and OR gate 130 operate as an interrupt signaling circuit. The output of AND gate 110 is connected via the ACK lead to EXTERNAL PROCESSOR 50 and the output of OR gate 130 is connected via the INT lead to MICROPROCESSOR 10. Microprocessor 10, decoder 20, and latches 80 and 90 operate as an internal processor.

The normal mode of operation is for EXTERNAL PROCESSOR 50 to have control of RAM 100 via ADDRESS AND CONTROL MULTIPLEXER 40 and DATA MULTIPLEXER 30. EXTERNAL PROCESSOR 50 can then cause data to be transmitted to the various I/O DEVICES by first transmitting external data to RAM 100 via DATA MULTIPLEXER 30. Upon completion of such data transfer EXTERNAL PROCESSOR 50 releases control of RAM 100 via these multiplexers, thereby allowing MICROPROCESSOR 10 to gain control of RAM 100, retrieve the memory data from it, and transmit that data to the desired I/O DEVICE. When MICROPROCESSOR 10 has finished transmitting data to the I/O DEVICE, it releases control of the multiplexers and RAM 100, and EXTERNAL PROCESSOR 50 again gains control of them.

Similarly, if data is to be received from an I/O DEVICE, MICROPROCESSOR 10 gains control of RAM 100 via the multiplexers, transmits internal data to RAM 100 and then releases control of it and the multiplexers. EXTERNAL PROCESSOR 50 then gains control of RAM 100 via the multiplexers and retrieves the memory data from it.

In order for EXTERNAL PROCESSOR 50 to transmit data to an I/O DEVICE, it must first gain control of RAM 100. To do this EXTERNAL PROCESSOR 50 provides a logic level 1 request signal on its request (REQ) lead. This signal is inverted to a logic level 0 signal by inverter 71 and applied to the set (S) input of latch 70, thereby causing it to set and provide a logic level 0 first service-requested signal at its $\bar{Q}$ output. This logic level 0 signal appears at the second input of OR gate 130 which then provides a logic level 1 interrupt signal on its INT lead. This logic level 1 interrupt signal is detected by MICROPROCESSOR 10 which then applies logic level 0 signals to decoder data leads, DD1 and DD2, and a positive pulse to decoder write lead (DWR). DECODER 20 responds to these signals by applying a logic level 0 first control signal to the reset (R) input of enable latch 80. This latch then provides a logic level 0 disable signal at its Q output. This logic level 0 signal disables RAM 100 and causes AND gate 110 to apply a logic level 0 signal to the ACK lead. EXTERNAL PROCESSOR 50 is then disabled from attempting to access RAM 100, since its internal protocol requires a logic level 1 acknowledge signal on the ACK lead before attempting such access.

MICROPROCESSOR 10 then applies logic level 0 and 1 signals to the DD1 and DD2 leads, respectively, and an associated positive pulse to the DWR lead. DECODER 20 responds to these signals by applying a logic level 0 second control signal to the set (S) input of select latch 90. This latch then provides a logic level 1 first select signal at its Q output. ADDRESS AND CONTROL MULTIPLEXER 40 responds to this logic level 1 first select signal by connecting external address (EAD1-EADn), read (ERD) and write (EWR) leads to RAM 100. Similarly, DATA MULTIPLEXER 30 responds to this logic level 1 first select signal by connecting the external data (ED1-ED8) leads to RAM 100. MICROPROCESSOR 10 then applies logic level 1 and 0 signals to the DD1 and DD2 leads, respectively, and a positive pulse to the DWR lead. DECODER 20 responds to these signals by applying a logic level 0 third control signal to the set (S) input of enable latch 80. This latch then provides a logic level 1 enable signal at its Q output. This signal, which enables RAM 100, also appears at the third input of AND gate 110.

The logic level 1 first select signal from the Q output of select latch 90 is inverted to a logic level 0 signal by inverter 120 and applied to the reset (R) input of request latch 70. This latch then resets and applies a logic level 1 signal to the second input of OR gate 130, causing it to remove the logic level 1 interrupt signal on the INT lead. Under these conditions, release latch 60 is reset and a logic level 1 signal appears at the first input of gate 110. Since the logic level 1 first select and enable signals also appear at the second and third inputs, respectively, of gate 110, this gate then applies a logic level 1 acknowledge signal to the ACK lead. This signal informs EXTERNAL PROCESSOR 50 that it may now access RAM 100.

Upon completion of transmission of data between EXTERNAL PROCESSOR 50 and RAM 100, EXTERNAL PROCESSOR 50 then applies a logic level 1 release signal to the release (RLS) lead. This logic level 1 signal is inverted to a logic level 0 signal by inverter 61 and applied to the set (S) input of release latch 60. This latch then sets and provides a logic level 0 second service-requested signal at its $\bar{Q}$ output. This logic level 0 signal causes OR gate 130 to provide a logic level 1 interrupt signal on the INT lead and also causes AND gate 110 to remove the acknowledge signal by applying a logic level 0 signal to the ACK lead. The removal of the acknowledge signal again prevents EXTERNAL PROCESSOR 50 from accessing RAM 100.

MICROPROCESSOR 10 responds to the interrupt signal by applying logic level 0 signals to the DD1 and DD2 leads and a positive pulse to the DWR lead. DECODER 20 responds to these signals by applying a logic level 0 signal to the reset (R) input of enable latch 80, thereby causing it to reset and remove the enable signal by providing a logic level 0 signal at its Q output. This signal causes RAM 100 to be disabled.

MICROPROCESSOR 10 then applies logic level 1 signals to the DD1 and DD2 leads and a positive pulse to the DWR lead. DECODER 20 responds to these signals by applying a logic level 0 fourth control signal to the reset (R) input of select latch 90, causing it to reset and provide a logic level 0 second select signal at its Q output. ADDRESS AND CONTROL MULTIPLEXER 40 responds to this logic level 0 signal by connecting the internal address (IAD1-IADn) read (IRD) and write (IWR) leads to RAM 100. Similarly, DATA MULTIPLEXER 30 responds to this logic level 0 signal by connecting the internal data (ID1-ID8) leads to RAM 100. This logic level 0 signal at the Q output of select latch 90 also appears at the reset (R) input of release latch 60, causing it to reset and thereby providing a logic level 1 signal at its $\bar{Q}$ output. OR gate 130 detects this logic level 1 signal and removes the interrupt signal by applying a logic level 0 signal to the INT lead. The logic level 0 signal at the Q output of select latch 90 also appears at the second input of AND gate 110, causing the acknowledge signal to remain reset by holding a logic level 0 signal on the ACK lead.

MICROPROCESSOR 10 then applies logic level 1 and 0 signals to the DD1 and DD2 leads, respectively, and a positive pulse to the DWR lead. DECODER 20 responds to these signals by applying a logic level 0 signal to the set (S) input of enable latch 80, thereby causing it to set and provide a logic level 1 enable signal at its Q output. This enable signal enables RAM 100 and MICROPROCESSOR 10 can then transmit data between RAM 100 and selected I/O DEVICES.

Upon completion of such data transfers, MICROPROCESSOR 10 returns control of RAM 100 to EXTERNAL PROCESSOR 50. This is done by disabling RAM 100, selecting EXTERNAL PROCESSOR 50 and enabling RAM 100. The signaling required to do this is identical to the signaling previously described in response to a request (REQ) signal.

The memory access circuit of the present invention thus allows control of a random access memory to be transferred between multiple processors. Even though the state of the processors' signals cannot be guaranteed during such transfers, the memory access control circuit of the present invention ensures that only valid data, address and control signals appear at the random access memory while the RAM is enabled.

It will be obvious to those skilled in the art that numerous modifications of the present invention can be made without departing from the spirit of the invention which shall be limited only by the scope of the claims appended hereto.

What is claimed is:

1. A memory access selection circuit in a computer system including an external processor, operated to provide external read and write signals, request and release signals, and further operated to transmit external data in association with said external write signal, said memory access selection circuit comprising:

an internal processor operated to provide internal read and write signals, and further operated to transmit internal data in association with said internal write signal, and further operated to provide enable, disable and first and second select signals;

a memory operated to transmit memory data in response to said enable signal and said internal or external read signal and further operated to receive said internal or external data in response to said internal or external write signal, respectively, and said enable signal;

said internal and external processors each further operated in response to said internal or external read signal respectively, to receive said memory data;

multiplexing means connected to said internal and external processors and said memory, and operated in response to said first select signal to connect said external processor to said memory, thereby allowing said external processor to transmit data to, and receive data from, said memory, in association with said external write and read signals, respectively, said multiplexing means further operated in response to said second select signal to connect said internal processor to said memory, thereby allowing said internal processor to transmit data to, and receive data from, said memory, in association with said internal write and read signals, respectively;

first storage means connected to said external processing and said internal processor, and operated in response to said request signal and said second select signal to provide a first service-requested signal and further operated in response to said release signal and said first select signal to provide a second service-requested signal; and an OR gate connected to said storage means and operated in response to said first or second service-requested signal to provide an interrupt signal;

and said internal processor operated in response to said interrupt signal and said first select signal to provide said second select signal and further operated to response to said interrupt signal and said second signal to provide said first select signal.

2. A memory access selection circuit as claimed in claim 1, wherein there is further included: acknowledge signaling means connected to said internal and external processors, and operated in response to said enable and first select signals to provide an acknowledge signal; said external processor operated in response to said acknowledge signal to provide said external read and write signals and receive and transmit said external and memory data, respectively.

3. A memory access selection circuit as claimed in claim 1, wherein said internal processor comprises:

a processing unit operated to provide first, second, third and fourth control signals, and a second storage means connected to said processing unit, and operated in response to said first control signal to provide said disable signal, further operated in response to said second control signal to provide said first select signal, further operated in response to said third control signal to provide said enable signal and further operated in response to said fourth control signal to provide said second select signal.

4. A memory access selection circuit as claimed in claim 3, wherein said second storage means comprises a first latch circuit operated to provide said enable and disable signals and a second latch circuit operated to provide said first and second select signals.

5. A memory access selection circuit as claimed in claim 1, wherein said multiplexing means comprises: a bi-directional data multiplexer and an address and control signal multiplexer.

6. A memory access selection circuit as claimed in claim 1, wherein said memory comprises: a random access memory.

7. A memory access selection circuit as claimed in claim 1, wherein said first storage means comprises first and second flip-flops operated to provide said first and second service-requested signals.

8. A memory access selection circuit as claimed in claim 2, wherein said acknowledge signaling means comprises: an AND gate.

9. A memory access selection circuit as claimed in claim 3, wherein said processing unit comprises:

a microprocessor operated to provide decoder data signals, decoder write signals, internal address and data signals internal read and write signals; and a decoder connected to said microprocessor and operated in response to said decoder data signals and said decoder write signals to provide said first, second, third and fourth control signals.

* * * * *